June 14, 1960  B. MARINUS  2,940,102
CAR WASHING DEVICE
Filed May 12, 1958
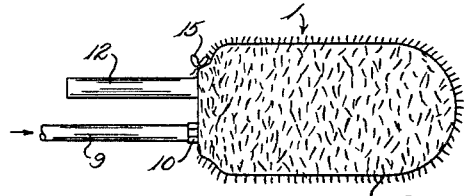
FIG.1
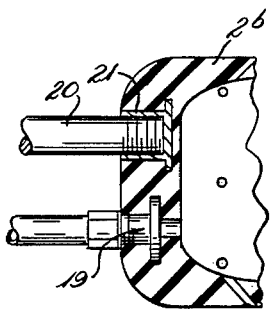
FIG. 6
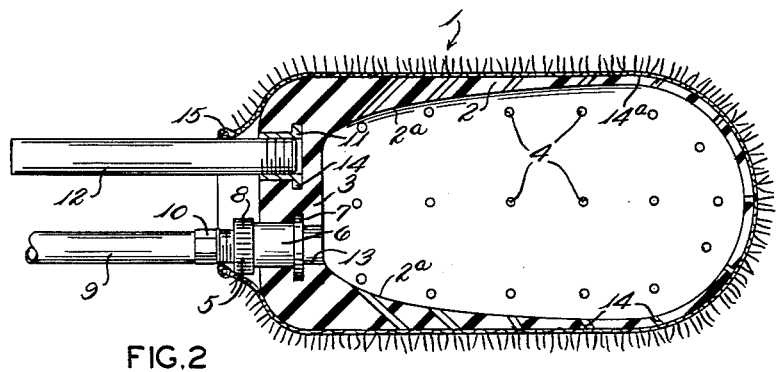
FIG.2
FIG.3
FIG.5
FIG.4
*INVENTOR.*
BERNARD MARINUS
BY
ATTYS.

United States Patent Office 2,940,102
Patented June 14, 1960

2,940,102

CAR WASHING DEVICE

Bernard Marinus, Akron, Ohio
(P.O. Box 12652 Main Post Office, St. Petersburg 33, Fla.)

Filed May 12, 1958, Ser. No. 734,562

3 Claims. (Cl. 15—128)

The present invention relates to car washing devices and equipment, and especially to a type of a manually operable car washing device having a fixed water supply connection provided therefor.

Heretofore there have been various types of car washing units provided, one example of which being the car washing glove with water supply means shown in United States Patent No. 2,663,890. However, insofar as I am aware, nearly all of such car washing gloves or similar articles have not been completely satisfactory in use. Thus, the car washing glove or other article might have a type of a water connection provided therefor that readily loosens or splits away from the remainder of the material forming the car washing article, the article might scratch the car, or the article might have such bulk as not to be suitably designed for washing around the bumpers or other confined areas or sections of the car, or they may have been objectionable for other reasons. In general, it has been my experience that the previous types of car washing articles provided have not been completely satisfactory to provide effective washing action for a long service life.

The general object of the present invention is to provide a novel and improved type of a car washer device characterized by the convenience of the means provided for grasping the device for washing action and by the sturdy construction of the device.

Another object of the invention is to mold a hose coupling member and a handle socket unit in a car washing bag so that other members can be readily secured thereto for facilitating grasping the article manually and for connecting a water hose thereto.

A further object of the invention is to provide a hollow perforated rubber or other flexible member for car washing action and to provide replaceable fabric covers over such resilient rubber water distribution sleeve or glove.

Yet another object of the invention is to provide a removable wooden handle or similar member that can be removably engaged with a car washing unit for convenient grasping thereof.

The foregoing and other objects and advantages of the invention will be made more apparent as the specification proceeds.

Attention now is particularly directed to the accompanying drawings, wherein:

Fig. 1 is an elevation of the improved car washing device of the invention embodying the principles thereof;

Fig. 2 is a longitudinal section taken of the car washing device of Fig. 1;

Fig. 3 is a side elevation of the car washing device, partially broken away and shown in vertical section;

Fig. 4 is an end elevation taken on line 4—4 of Fig. 3;

Fig. 5 is an elevation like Fig. 1, only on an enlarged scale and showing a modified embodiment of the invention; and Fig. 6 is a fragmentary enlarged vertical section of a further modification of the invention.

When referring to corresponding parts shown in the drawings and referred to in the specification, corresponding numerals are used to facilitate comparison therebetween.

The present invention relates to car washing devices or the like comprising a hollow flexible or resilient bag with a thickened base portion thereon, hose connection means integrally bonded to the base portion of the bag and operatively carried thereby and extending therefrom, a handle socket integrally bonded to the base portion of the bag and exposed at an end portion thereof, handle means engaging the handle socket and protruding from the bag for support action therefor, which bag has a plurality of water distributing apertures provided therein, and cover means removably secured to the bag and with the handle means protruding from the cover for support action for the car washing device.

Attention now is particularly directed to the details of the structure shown in the drawings, and the car washing device is indicated as a whole by the numeral 1. The car washing device or article of the invention in general comprises a hollow flexible, resilient bag 2 with an appreciably thickened base portion 3 provided thereon. The bag 2 is shown as having a plurality of water distributing apertures or holes 4 in at least one surface thereof, although such apertures can be provided on the side, and top and bottom surfaces of the bag so that any desired water release pattern is provided by the apertures 4 formed in the bag 2. Usually such a bag 2 is made by molding operations and it can be made from the conventional rubber, or rubber-like materials, or suitable similar plastic substances, as desired.

It is an important feature of the present invention that the bag 2 has integrally bonded thereto a hose connection means, such as a hose coupling 5 of at least substantially standard construction. This hose coupling 5 includes a sleeve 6 that may have an end flange 7 thereon and with the hose coupling including a rotatable nut 8 to form a watertight connection between the sleeve 6 and a standard water supply hose 9 by the standard male coupling 10 provided thereon. Preferably such hose coupling 5 is integrally bonded to the bag 2 by forming the bag and hose coupling as an integral molded unit. Such bag 2 also preferably has a handle socket 11 integrally bonded thereto. Such handle socket 11 has suitable threads provided thereon so that a threaded elongate, cylindrical handle 12 can be removably engaged therewith. Of course, the hose coupling 5 connects to the interior of the bag 2 by suitable means such as a bore 13 molded into the base portion of the bag.

If necessary, the handle socket 11 can have a flange 14 provided on the axially inner end thereof to aid in providing a solid bonded engagement between the handle socket 11 and the base portion 3.

Preferably this bag 2 is of tapered shape from the base end 3 thereof to the top end of the bag so that the bag can be more or less of wedge shape.

Any suitable cover is usually removably secured over the bag 2 and in this instance a fabric cover 14a is provided that may have some suitable type of a drawstring 15 provided therein engaging the base end portion 3 of the bag 2 to retain the cover in engagement with the bag. Of course, these covers 14a can be replaced as worn, or they can be removed to be washed, or for other action.

The covers around the bags of the invention may come down around the handle 12 and hose 9, for example, a short distance and have resilient engagement therewith to aid in providing a convenient means to grasp the device 1 and to reduce water leakage from around the bag end.

In Fig. 5, there is shown slight modification of the invention wherein a grip member, or auxiliary handle 16 is provided. Such grip member is telescopically engaged with a cylindrical handle 12a that extends through an axially extending bore 17 provided in the grip member 16. Such grip member 16 has one concave side 18 provided thereon which closely parallels the hose coupling 5a provided. The grip member 16 thus can be conveniently grasped by the user of the car washer device 1 for ready handling such device. The person using the washing device or article will usually grasp the hose extending from the coupling 5a simultaneously with grasp of the grip member 16 for control of the car washing unit.

A further modification of the invention is shown in Fig. 6 and in this instance a permanent type of a hose coupling 19 is bonded to a bag 2b, when it is desirable to have permanent engagement between the car washing device and the water supply hose or line. The handle 20 is engaged with a threaded socket 21 directly molded into the bag 2b without the use of any auxiliary support sleeve, or ferrule.

To aid in control of the bags 2 or the like, preferably a pair of thickened reenforcing sections or walls 2a are provided. These walls usually are from one and one half to two times the thickness of the remainder of the bag and smoothly blend into the base 3. Such walls 2a may extend one half to about two thirds the length of the bag to make it self supporting.

In view of the foregoing, it should be seen that a novel and improved type of a car washing device has been provided by the invention. This device is of sturdy construction and it has a plurality of different types of handle means that can be engaged therewith to aid in support action and use of the car washer. The washer unit can be used from both sides and top and bottom thereof. Obviously, the handle can be of any desired length for remote control and use of the car washing device. Thus it is believed that the objects of the invention have been achieved.

While several complete embodiments of the invention have been disclosed herein, it will be appreciated that modification of these particular embodiments of the invention may be resorted to without departing from the scope of the invention as defined in the appended claims.

What I claim is:

1. A car washing device or the like comprising an elongated hollow flexible bag with a base portion thereon, said bag being thickened at said base portion and having a pair of opposed thickened reenforcing walls extending about half the length of said bag to make the bag self supporting, metal hose connection means integrally bonded to said base portion of said bag and operatively carried thereby but extending therefrom, said hose connection means connecting to the interior of said bag by a bore in said base portion, a metal handle socket integrally bonded to said base portion and operatively carried thereby, handle means engaging said handle socket and protruding from said bag for support action for said bag, said handle means being parallel to a hose connected to said hose connection means to permit grasping of said handle means and hose for convenient support and control of the device, said bag having water distributing apertures provided therein, and a porous cover removably secured to and around said bag with said handle means protruding therefrom.

2. A car washing device or the like comprising a hollow resilient bag with a base portion thereon, a hose coupling integrally bonded to said base portion of said bag and operatively extending therefrom, said base portion having a bore therein connecting said hose coupling to the interior of said bag, a threaded handle socket integrally bonded to said base portion and operatively carried thereby, threaded handle means removably engaging said handle socket and protruding axially from said bag for support action for said bag, said bag having water distributing apertures provided therein, a porous cover removably secured to and around said bag with said handle means protruding therefrom, said handle means being spaced slightly from said hose coupling, and a grip member carried by said handle means, said grip member being positioned against said hose coupling and forming, with a hose connected to said hose coupling, a convenient grip for the car washing device.

3. A car washing device or the like comprising a hollow resilient bag with a base portion thereon, a hose coupling integrally bonded to said base portion of said bag and operatively extending therefrom, said base portion having a bore therein connecting said hose coupling to the interior of said bag, a threaded handle socket integrally bonded to said base portion and operatively carried thereby, threaded handle means removably engaging said handle socket and protruding axially from said bag for support action for said bag, said bag having water distributing apertures provided therein, a porous cover removably secured to and around said bag with said handle means protruding therefrom, said handle means being cylindrical and spaced slightly from but being parallel to said hose coupling, and a longitudinally apertured grip member telescopically carried by said handle means, said grip member being positioned against said hose coupling to form with a hose secured to said hose coupling a convenient grip for the car washing device, a portion of said hose lying against a recessed edge of said grip member.

References Cited in the file of this patent
UNITED STATES PATENTS

| 768,710 | Vanderman | Aug. 30, 1904 |
| 785,824 | Nicholls | Mar. 28, 1905 |
| 1,334,911 | Lampkin | Mar. 23, 1920 |
| 1,395,763 | Mulherin | Nov. 1, 1921 |
| 1,612,913 | Gerken | Jan. 4, 1927 |
| 1,660,095 | Schiele | Feb. 21, 1928 |